(12) United States Patent
Arisi et al.

(10) Patent No.: US 11,333,023 B2
(45) Date of Patent: May 17, 2022

(54) ARTICLE HAVING COOLING PASSAGE NETWORK WITH INTER-ROW SUB-PASSAGES

(71) Applicant: United Technologies Corporation, Farmington, CT (US)

(72) Inventors: Allan N. Arisi, Manchester, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 129 days.

(21) Appl. No.: 16/594,224

(22) Filed: Oct. 7, 2019

(65) Prior Publication Data

US 2020/0149412 A1    May 14, 2020

Related U.S. Application Data (60) Provisional application No. 62/757,910, filed on Nov. 9, 2018.

(51) Int. Cl.
| | |
|---|---|
| *F01D 5/18* | (2006.01) |
| *F01D 5/08* | (2006.01) |
| *F01D 9/06* | (2006.01) |

(52) U.S. Cl.
CPC ............... *F01D 5/187* (2013.01); *F01D 5/08* (2013.01); *F01D 9/065* (2013.01);
(Continued)

(58) Field of Classification Search
CPC . F01D 5/187; F01D 5/08; F01D 9/065; F05D 2240/124; F05D 2240/123; F05D 2250/11; F05D 2260/22141
See application file for complete search history.

(56) References Cited

U.S. PATENT DOCUMENTS

| | | | |
|---|---|---|---|
| 7,731,481 B2 | 6/2010 | Cunha et al. | |
| 7,815,414 B2 * | 10/2010 | Devore | F01D 25/32 |
| | | | 415/115 |

(Continued)

FOREIGN PATENT DOCUMENTS

| | | | | |
|---|---|---|---|---|
| EP | 1533480 | 5/2005 | | |
| EP | 1533480 A2 * | 5/2005 | ............... | F01D 5/20 |

(Continued)

OTHER PUBLICATIONS

European Search Report for European Patent Application No. 19208282.4 completed Mar. 25, 2020.

*Primary Examiner* — Courtney D Heinle
*Assistant Examiner* — Ryan C Clark
(74) *Attorney, Agent, or Firm* — Carlson, Gaskey & Olds, P.C.

(57) ABSTRACT

A gas turbine engine article includes a cooling passage network embedded in an article wall between inner and outer portions of the article wall. The network has an inlet orifice through the inner portion to receive cooling air from a cavity, a sub-passage region that includes an array of pedestals, and at least one outlet orifice through the outer portion. The array of pedestals includes first pedestals arranged in a first row and second pedestals arranged in a second, adjacent row. The first pedestals and the second pedestals define inter-row sub-passages there between. Each of the inter-row sub-passages has an inlet mouth, an outlet mouth, and a compound channel connecting the inlet mouth and the outlet mouth. The compound channel includes a first channel length over which the inter-row sub-passage has a constant cross-section and a second channel length over which the inter-row sub-passage has a non-constant cross-section.

23 Claims, 7 Drawing Sheets

(52) U.S. Cl.
CPC .... *F05D 2240/124* (2013.01); *F05D 2250/11* (2013.01); *F05D 2260/22141* (2013.01)

(56) References Cited

U.S. PATENT DOCUMENTS

| | | | |
|---|---|---|---|
| 9,840,927 B2 | 12/2017 | Tucker | |
| 9,879,546 B2 * | 1/2018 | Hudson | B22C 9/24 |
| 10,704,397 B2 * | 7/2020 | Marsh | F01D 5/187 |
| 2010/0247328 A1 | 9/2010 | Cunha | |
| 2014/0010666 A1 * | 1/2014 | Hudson | B22C 9/10 |
| | | | 416/97 R |
| 2014/0033736 A1 * | 2/2014 | Propheter-Hinckley | B22C 9/04 |
| | | | 60/801 |

FOREIGN PATENT DOCUMENTS

| | | | |
|---|---|---|---|
| EP | 3056674 | 8/2006 | |
| EP | 3034808 | 6/2016 | |
| EP | 3650648 A1 * | 5/2020 | ................ F02C 3/04 |
| WO | 0100964 | 1/2001 | |
| WO | WO-0100964 A1 * | 1/2001 | ............. F01D 5/187 |
| WO | 2016160029 | 10/2016 | |

\* cited by examiner

ARTICLE HAVING COOLING PASSAGE NETWORK WITH INTER-ROW SUB-PASSAGES

CROSS-REFERENCE TO RELATED APPLICATION

This application claims priority to U.S. Provisional Application No. 62/757,910 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine article according to an example of the present disclosure includes an article wall that defines a cavity. There is a cooling passage network embedded in the article wall between inner and outer portions of the article wall. The cooling passage network has an inlet orifice through the inner portion of the article wall to receive cooling air from the cavity, a sub-passage region that has an array of pedestals, and at least one outlet orifice through the outer portion. The array of pedestals have first pedestals arranged in a first row and second pedestals arranged in a second, adjacent row. The first pedestals and the second pedestals define inter-row sub-passages there between. Each of the inter-row sub-passages have an inlet mouth, an outlet mouth, and a compound channel connecting the inlet mouth and the outlet mouth. The compound channel has a first channel length over which the inter-row sub-passage has a constant cross-section and a second channel length over which the inter-row sub-passage has a non-constant cross-section.

In a further embodiment of any of the foregoing embodiments, the non-constant cross-section converges toward the constant cross-section.

In a further embodiment of any of the foregoing embodiments, the non-constant cross-section converges from the inlet mouth to the first channel length.

In a further embodiment of any of the foregoing embodiments, the first channel length spans a length L1 and the constant cross-section defines a width W1 that is perpendicular to the length L1, and L1 is greater than W1.

In a further embodiment of any of the foregoing embodiments, the length L1 is greater than the width W1 by a factor of at least 2.

In a further embodiment of any of the foregoing embodiments, the length L1 is no greater than 10 times the width W1.

In a further embodiment of any of the foregoing embodiments, the length L1 is greater than the width W1 by a factor of at least 4.

In a further embodiment of any of the foregoing embodiments, the first channel length spans a length L1 and the second channel length spans a length L2, and L1 is equal to L2 within +/−10%.

In a further embodiment of any of the foregoing embodiments, the first channel length spans a length L1 and the constant cross-section defines a width W1 that is perpendicular to the length L1, and L1 is greater than W1 by a factor of at least 2.

In a further embodiment of any of the foregoing embodiments, the length L1 is no greater than 10 times the width W1.

In a further embodiment of any of the foregoing embodiments, the length L1 is greater than the width W1 by a factor of at least 4.

In a further embodiment of any of the foregoing embodiments, the pedestals are either all triangular or all lobed-diamonds.

In a further embodiment of any of the foregoing embodiments, the second channel length is between the inlet mouth and the first channel length.

In a further embodiment of any of the foregoing embodiments, the first channel length spans a length L1 and the second channel length spans a length L2, and L1 is greater than L2 by at least 10%.

A further embodiment of any of the foregoing embodiments includes a third channel length of non-constant cross-section that is discontinuous with the second channel length. The second channel length is between the first channel length and the inlet mouth and the third channel length is between the first channel length and the outlet mouth.

In a further embodiment of any of the foregoing embodiments, the first channel length spans a length L1 and the constant cross-section defines a width W1 that is perpendicular to the length L1, and L1 is greater than W1 by a factor of at least 2.

In a further embodiment of any of the foregoing embodiments, the length L1 is no greater than 10 times the width W1.

In a further embodiment of any of the foregoing embodiments, each of the pedestals has an aspect ratio of no greater than 2.

A gas turbine engine according to an example of the present disclosure includes a compressor section, a combustor in fluid communication with the compressor section, and a turbine section in fluid communication with the combustor. The turbine section has a turbine engine article according to any of the foregoing embodiments.

A tool according to an example of the present disclosure includes a molding cavity operable for molding an investment core that is shaped to form a cooling passage network embedded in a wall of a gas turbine engine article. The investment core represents a negative of the cooling passage network in which solid structures of the investment core produce void structures in the cooling passage network and void structures of the investment core produce solid structures in the cooling passages network. The investment core has the negative of the following structures of the cooling passage network: an inlet orifice, a sub-passage region that has an array of pedestals, and at least one outlet orifice. The array of pedestals has first pedestals arranged in a first row and second pedestals arranged in a second, adjacent row. The first pedestals and the second pedestals define inter-row sub-passages there between. Each of the inter-row sub-passages have an inlet mouth, an outlet mouth, and a compound channel connecting the inlet mouth and the outlet mouth. The compound channel includes a first channel length over which the inter-row sub-passage has a constant cross-section and a second channel length over which the inter-row sub-passage has a non-constant cross-section.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
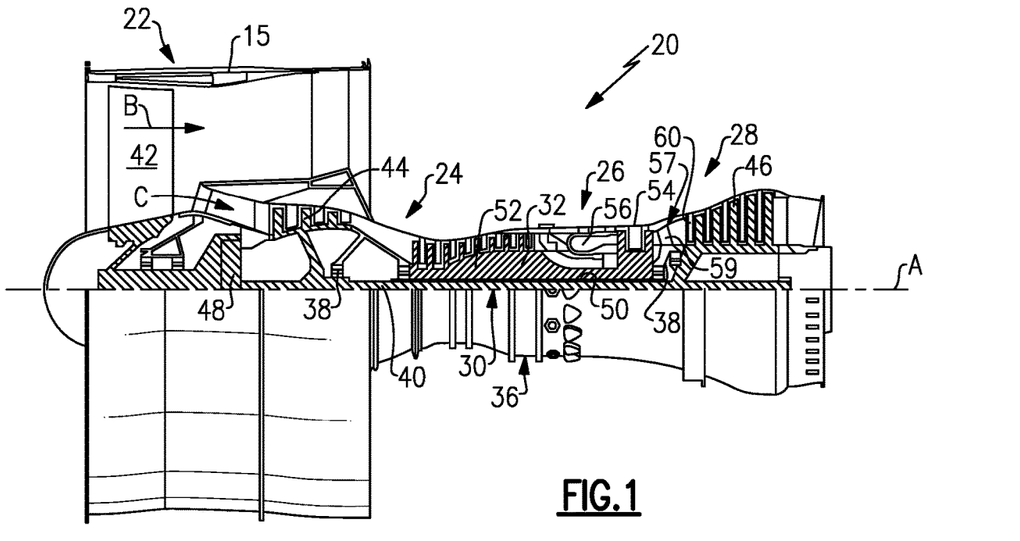
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7° R)]^0.5. The "Low corrected fan tip speed" as disclosed herein according to one non-limiting embodiment is less than about 1150 ft/second (350.5 meters/second).

Figure 2:
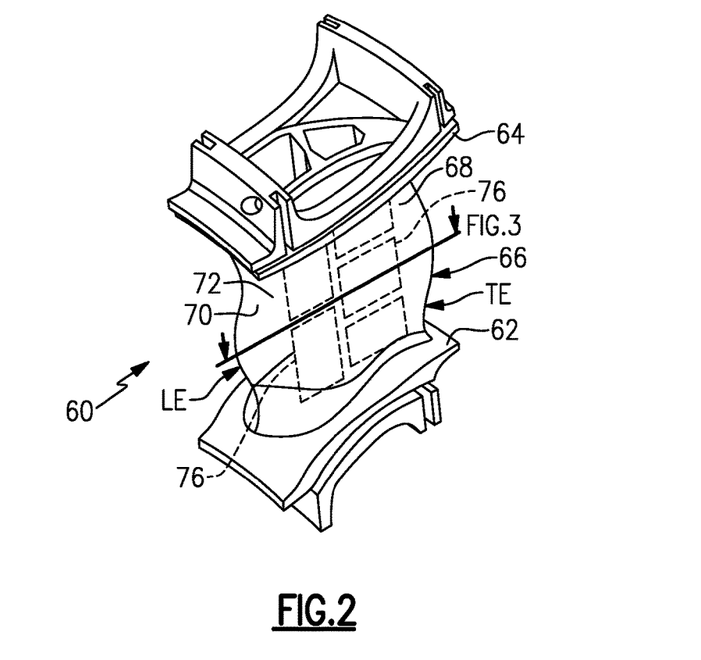
FIG. 2 illustrates an airfoil of the engine of FIG. 1.

FIG. 2 illustrates a representative example of a gas turbine engine article, namely a turbine airfoil 60 used in the turbine engine 20 (see also FIG. 1). As shown, the turbine airfoil 60 is a turbine vane; however, it is to be understood that, although the examples herein may be described with reference to the turbine vane airfoil, this disclosure is also applicable to turbine blades and blade outer air seals. The turbine airfoil 60 is also shown in a cross-sectioned view in FIG. 3.

Figure 3:
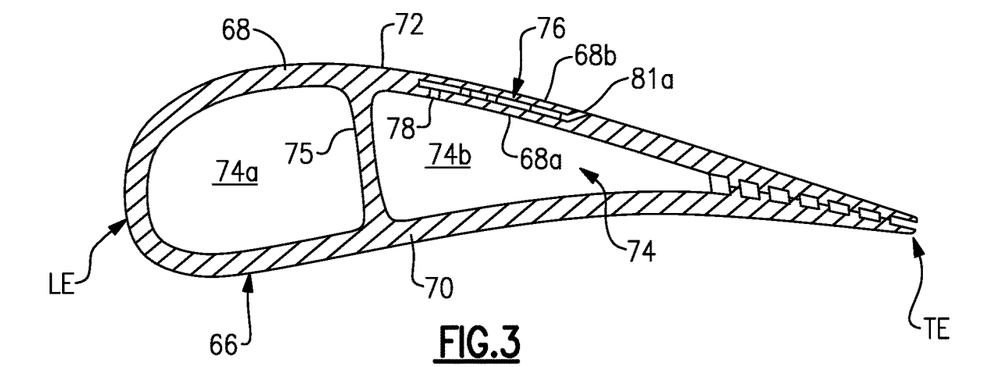
FIG. 3 illustrates a sectioned view of the airfoil of FIG. 3.

Referring to FIGS. 2 and 3, the turbine airfoil 60 includes an inner platform 62, an outer platform 64, and an airfoil section 66 that spans between the inner and outer platforms 62/64. The airfoil section 66 includes an article wall or airfoil outer wall 68 that delimits the profile of the airfoil section 66. The outer wall 68 defines a leading end (LE), a trailing end (TE), and first and second sides 70/72 that join the leading and trailing ends. In this example, the first side 70 is a pressure side and the second side 72 is a suction side. The outer wall 68 circumscribes an internal core cavity 74, which in this example is partitioned by a rib 75 into a forward core cavity 74a and an aft core cavity 74b. As will be appreciated, there may alternatively be only a single core cavity or there may be additional ribs to partition additional core cavities.

There is at least one cooling passage network 76 embedded in the airfoil outer wall 68 between inner and outer portions 68a/68b of the airfoil wall 68. For example, as shown (FIG. 3) one or more of the cooling passage networks 76 is embedded in the second side 72 of the outer wall 68, although one or more networks 76 could additionally or alternatively be embedded in the first side 70. The cooling passage networks 76 may also be referred to as minicores or minicore passages. A "minicore" or "minicore passage" is a reference to the small investment casting core that is typically used to make such an embedded passage, as opposed to a main core that is used to form a main or central core cavity in an airfoil.

Figure 4:
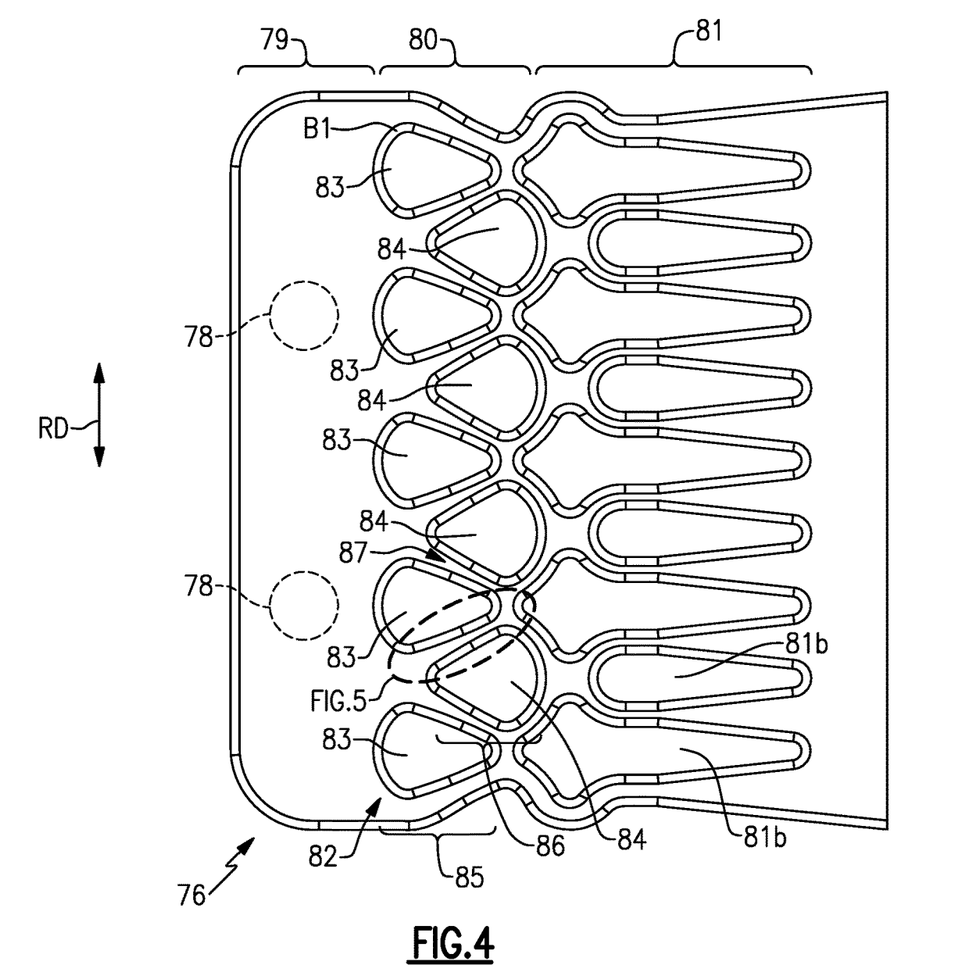
FIG. 4 illustrates an "inverse" or negative view of a cooling passage network of the airfoil of FIG. 3.

FIG. 4 shows an "inverse" or negative view of a representative one of the cooling passage networks 76. The inverse view is also representative of an investment core that may be used in an investment casting process to form the network 76 in the airfoil 60. Most typically, the investment casting core is injection molded from a material that contains ceramic or metal alloy. The investment core is shaped to form the cooling passage network 76. In the inverse view, solid structures of the investment core produce void structures in the cooling passage network 76 and void structures of the investment core produce solid structures in the cooling passage network 76. Thus, the investment core has the negative of the structural features of the cooling passage network 76. It is to be understood that although the inverse views presented herein may be used to describe features of the network 76, each negative view also represents an investment core and a corresponding cavity in a molding tool that is operable to molding the investment core.

The cooling passage network 76 includes at least one inlet orifice 78 through the inner portion 68a of the airfoil outer wall 68 (FIG. 3) to receive cooling air from the internal core cavity 74. Most typically, the network 76 will include two inlet orifices 78. A single, exclusive inlet orifice 78 is also contemplated, as well as more than two inlet orifices 78, although fabrication may be challenging.

The inlet orifices 78 open into a radially-elongated manifold region 79 (see FIG. 4, radial direction RD), which serves to distribute the cooling air to a downstream sub-passage region 80, which then leads into an exit region 81 that feeds into one or more outlet orifices 81a (FIG. 3) through the outer portion 68b of the airfoil wall 68. In this example, the exit region 81 includes a plurality of flow guides 81b. For instance, the flow guides 81b have a teardrop shape and facilitate straightening and guiding flow into the one or more outlet orifices 81a. In general, the inlet orifices 78 of the network 76 are located forward of the one or more outlet orifices 81a.

One of the inlet orifices 78 is located in the radially upper half of the manifold region 79 and the other of the inlet orifices 78 is in the radially lower half of the manifold region 79. Most typically, the radially upper and lower halves of the network 76 are mirror images, i.e., symmetric relative to the midline of the network 76 between the two inlet orifices 78.

In this example, the region 80 includes an array of pedestals 82. The array of pedestals 82 includes first pedestals 83 and second pedestals 84. The first pedestals 83 are arranged in a first row 85 and the second pedestals 84 are arranged in a second row 86. The rows 85/86 extend in the radial direction RD in the airfoil 60, which is perpendicular to the engine axis A. The second pedestals 84 are also radially offset from the first pedestals 83 and interleaved with the first pedestals 83 so as to define inter-row sub-passages 87 there between, as opposed to intra-row sub-passages within the rows 85/86 defined between either adjacent first pedestals 83 or defined between adjacent second pedestals 84.

The first and second pedestals 83/84 as shown have a triangular shape and are all of unequal size in cross-section, although in modified examples the pedestals 83/84 can be of equal size in cross-section. For example, the triangular shape of the cross-section of the pedestals 83/84 defines three points, or apexes, and three sides that connect the three apexes. In general, the sides may be curved, linear, or combinations of curved and linear.

Figure 5:
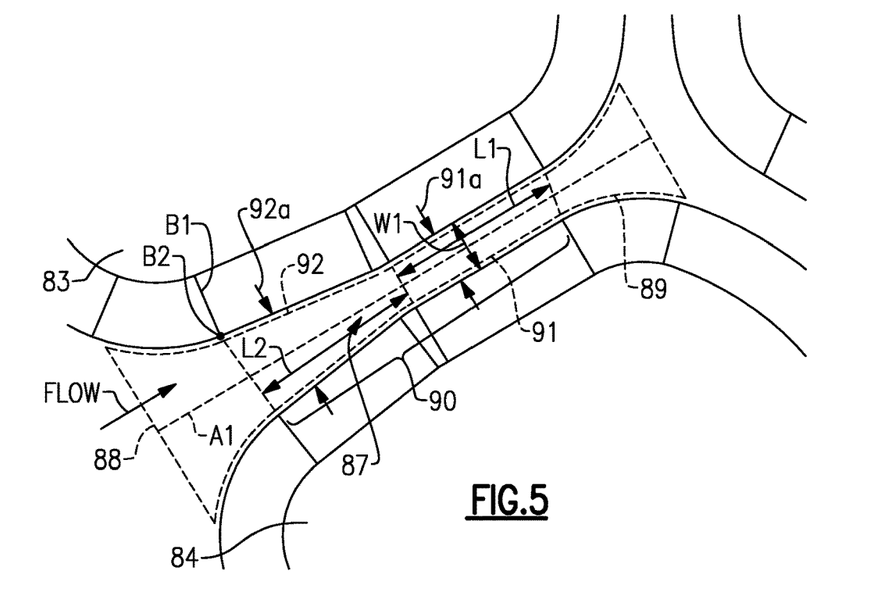
FIG. 5 illustrates a magnified view of a sub-passage of the cooling network passage of FIG. 4.

FIG. 5 shows a magnified view of a representative one of the inter-row sub-passages 87 (hereafter "sub-passage 87"), in which various sections of the sub-passage 87 are identified by dashed lines. The sections are arranged along a central sub-passage axis A1, which is the midline between the sides of the adjacent first and second pedestals 83/84 that define the sub-passage 87.

The sub-passage 87 has an inlet mouth 88, an outlet mouth 89, and a compound channel 90 connecting the inlet mouth 88 and the outlet mouth 89. For instance, the inlet mouth 88 converges and the outlet mouth 89 diverges with regard to the direction of flow through the sub-passage 87. As an example, the limits of these sections may be demarcated by inflections on one or both of the sides of the pedestals 83/84 or other locations on the sides at which the geometry of the sides distinctly changes, such as but not limited to, locations where a curved portion changes to a linear portion, locations where two linear portions of different slope meet, or locations where two curved portions of different radii of curvature meet. In the examples herein (e.g., see FIGS. 4 and 5), the sides of the pedestals are designated with break lines B1 that represent locations B2 on the sides at which the geometry of the pedestals distinctly changes.

The compound channel 90 includes a first channel length 91 over which the sub-passage 87 has a constant cross-section, which is represented at 91a, and a second channel length 92 over which the sub-passage 87 has a non-constant cross-section, which is represented at 92a. In a further example, the first channel length 91 is also linear. Although "first" and "second" are used to designate the sections of the channel lengths 91/92, it is to be understood that such designations do not necessarily represent the serial flow order of the sections. The cross-sections 91a/92a are sections taken perpendicular to the central sub-passage axis A1.

In this example, the second channel length 92 is situated between the inlet mouth 88 and the first channel length 91. For instance, the second channel length 92 starts at the terminal end of the inlet mouth 88 and spans continuously to its own terminal end, at which the first channel length 91 then starts. The first channel length 91 is situated between the second channel length 92 and the outlet mouth 89. For instance, the first channel length 91 starts at the terminal end of the second channel length 92 and spans continuously to its own terminal end, at which the outlet mouth 89 then starts.

The first channel length 91 extends over a length L1 and the second channel length 92 extends over a length L2. For example, the lengths L1 and L2 are the distances along the central sub-passage axis A1. In the example shown, the length L1 of the first channel length 91 is equal to the length L2 of the second channel length L2 within +/−10%.

During operation of the engine 20, cooling air, such as bleed air from the compressor section 24, is provided to the internal core cavity 74 and flows into the network 76 via the inlet orifices 78. The manifold region 79 serves to distribute the flow of cooling air to the sub-passage region 80, where the cooling air flows through the sub-passages 87 and then into the exit region 81 before being discharged through the one or more outlet orifices 81a to the exterior of the airfoil 60.

With regard to the sub-passages 87, the cooling air first enters the inlet mouth 88, which feeds the cooling air into the second channel length 92. In this example, the non-constant cross-section 92a converges toward the constant cross-section 91a and thereby compresses and accelerates the flow of cooling air. For instance, the non-constant cross-section 92a converges starting from the inlet mouth 88 and up to the first channel length 91. The second channel length 92 feeds the accelerated flow of cooling air into the first channel length 91, which then feeds the flow of cooling air to the outlet mouth 89 where the cooling air is discharged from the sub-passage 87. In one example, the second channel length 92 converges at an angle of 5° to 20°, and especially 10° to 18°. As an alternative, to tailor the cooling effects, the non-constant cross-section 92a may instead diverge toward the constant cross-section 91a and thereby expand and decelerate the flow of cooling air.

The constant cross-section 91a of the first channel length 91 is the narrowest stretch of the sub-passage 87 and thus serves to meter the flow of cooling air through the sub-passage 87 to facilitate controlled cooling of the airfoil wall 68, and in particular to facilitate controlled cooling of the outer portion 68b of the airfoil wall 68.

In addition to the metering function, the constant cross-section 91a of the first channel length 91 also enables enhanced durability in the fabrication process of the investment core used to form the network 76. More specifically, the material that is injected into the tool cavity to form the investment core contains ceramic or metal that erodes the wall of the tool cavity over molding cycles, changing original design dimensions that are important for flow metering. For instance, in locations where the tool cavity converges, the material impinges more directly against the cavity wall during injection and thereby accelerates erosion at that location in comparison to non-converging locations. In a sub-passage that has a singular point location of convergence to meter flow, that singular point location corresponds to such a location of greater erosion in the tool cavity during the molding process. As a result, the tool cavity at that singular point location, which is designed to have a particular dimension for proper flow metering, enlarges over multiple molding cycles due to erosion. In turn, over many molding cycles in the tool cavity, the resulting singular point location in the sub-passage enlarges and departs from design tolerances, thereby potentially changing the flow of cooling air through the sub-passage. And in instances where the design dimension departs significantly, the tool may need to be repaired or replaced.

The constant cross-section 91a of the first channel length 91 mitigates the effect of such erosion. Specifically, the location in the tool cavity corresponding to the leading end of the first channel length 91 may experience erosion. However, the location in the tool cavity corresponding to the first channel length 91 is eroded from the leading end thereof (adjacent the second channel length 92) toward the trailing end thereof (adjacent the outlet mouth 89). As an example, over a first number of injection molding cycles, the location in the tool cavity corresponding to the first channel length 91 may erode over 25% of the length L1 starting from the leading end thereof. The cross-section 91a of the 25% of the initial portion of the first channel length 91 would thus enlarge beyond the initial cross-section 91a. The remaining 75% of the length L1 of the first channel length 91 would experience no erosion, or at least less erosion, and the initial cross-section 91a would thus be preserved.

Similarly, over a second, greater number of injection molding cycles, the location in the tool cavity corresponding to the first channel length 91 may erode over 75% of the length L1 from the leading end thereof. The cross-section 91a of the 75% of the initial portion of the first channel length 91 would thus enlarge beyond the initial cross-section 91a. The remaining 25% of the length L1 of the first channel length 91 would experience no erosion, or at least less erosion, and the initial cross-section 91a would thus be preserved.

The preservation of the initial cross-section 91a over at least a portion of the length L1 in such a manner thereby ensures that the investment cores that are produced after many molding cycles are not unduly oversized and that the sub-passages 87 that are eventually produced from the investment cores have a narrowest portion that is dimensioned to properly meter the flow of cooling air. As will be further appreciated, the molding tool can also be used for a longer period of time before repair or replacement is necessary.

The first channel length 91 is configured to mitigate the above-described erosion concerns. As will be appreciated from the description above, designing the first channel length 91 with a greater length L1 would enhance mitigation of the erosion concern, as more molding cycles would be required to erode the full length of the first channel length 91. Inversely, a shorter length L1 would somewhat diminish mitigation of the erosion concern, as fewer molding cycles would be necessary to erode the full length of the first channel length 91. In this regard, it is contemplated that the first channel length 91 should have a minimum relative size in order achieve enhanced mitigation of erosion. As an example, the first channel length 91, spans over the length L1 and the constant cross-section 91a defines a width W1 along the direction perpendicular to the central sub-passage axis A1 between the sides of the adjacent pedestals 83/84. The length L1 is at least equal to the width W1, and in further example the length L1 is greater than width W1. In an additional example, the length L1 is greater than the width W1 by a factor of at least 2 or by a factor of at least 4. As will be appreciated, there may be constraints on the size and number of the pedestals 83/84 and overall "footprint" size of the network 76 in the airfoil 60. Given these constraints, it is thus contemplated that the first channel length 91 will also have a maximum size in which the length L1 is no greater than 10 times the width W1.

Figure 6:
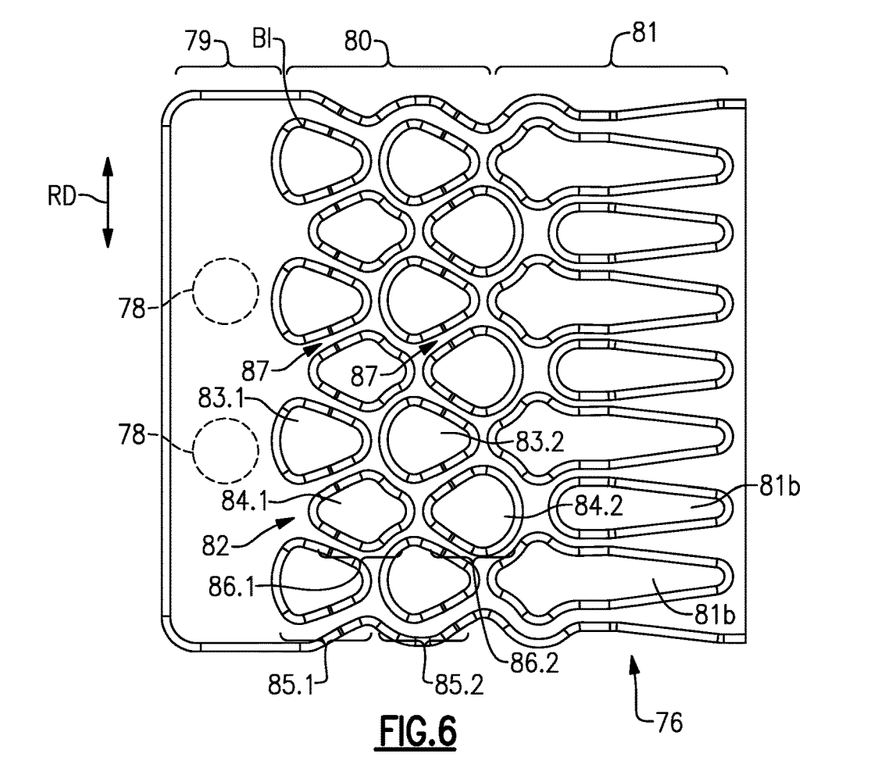
FIG. 6 illustrates another example cooling passage network that has additional rows of pedestals.
Figure 7:
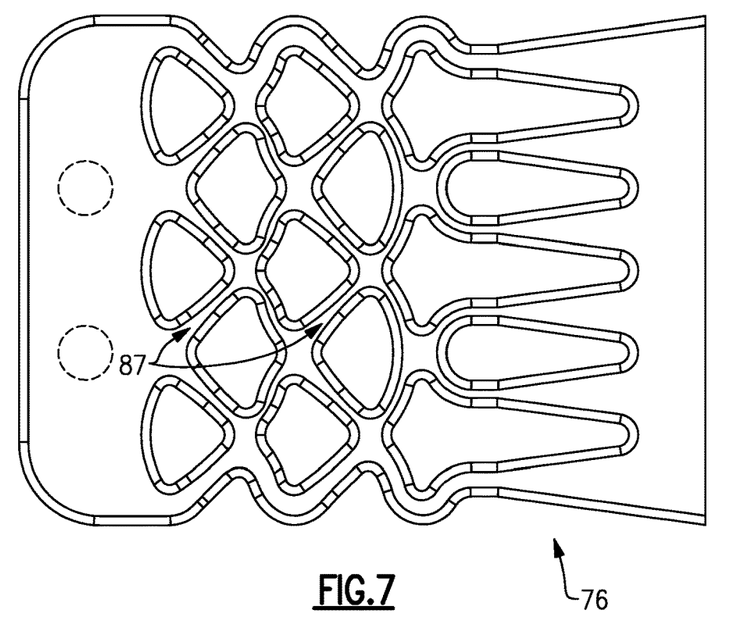
FIG. 7 illustrates another example cooling passage network that is smaller than the example of FIG. 6.
Figure 8:
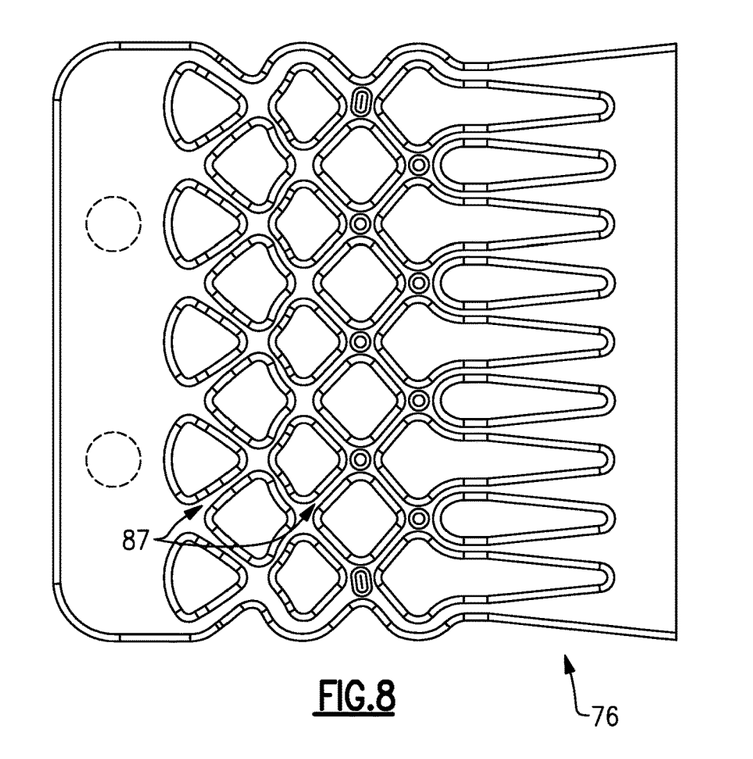
FIG. 8 illustrates another example cooling passage network that is larger than the example of FIG. 6.

As will also be appreciated, the geometry of the pedestals 83/84 and the number of rows 85/86 can also be varied to tailor flow of the cooling air and the resulting cooling effects while also retaining the above-described sub-passages 87. FIGS. 6, 7, and 8 illustrate such modified examples, although it is to be understood that this disclosure is not limited. In the example shown in FIG. 6, the network 76 contains two first rows, represented at 85.1 and 85.2, and two second rows, represented at 86.1 and 86.2. Where appropriate in this disclosure, identical whole numbers designate corresponding elements among the examples and the addition of a trailing decimal number is used as indication of a modification in the particular example being described. Also where appropriate, identical whole numbers may be used with the addition of one-hundred or multiples of one-hundred to designate corresponding elements among different embodiments.

The array of pedestals 82 includes first pedestals 83.1 that are arranged in the first row 85.1, and second pedestals 84.1 that are arranged in the second row 86.1. The array of pedestals 82 further includes an additional set of first pedestals 83.2 that are arranged in the other first row 85.2, and an additional set of second pedestals 84.2 that are arranged in the other second row 86.2. The second pedestals 84.1 are radially offset from the first pedestals 83.1 and interleaved with the first pedestals 83.1 so as to define the sub-passages 87 there between. Likewise, the second pedestals 84.2 are radially offset from the first pedestals 83.2 and interleaved with the first pedestals 83.2 so as to define the sub-passages 87 there between.

In this example, the pedestals 83.1, 83.2, and 84.2 have a triangular shape and may be of equal or unequal size in cross-section. In comparison to the pedestals 83 and 84, the pedestals 83.1, 83.2, and 84.2 are somewhat larger, especially in the radial direction RD. The pedestals 84.1 have a non-triangular shape. In the example shown, the pedestals 84.1 have an irregular diamond cross-section which is defined by four points, or apexes, and four sides that connect the four apexes. In general, the sides may be curved, linear, or combinations of curved and linear.

The modified examples of the network 76 shown in FIGS. 7 and 8 are similar to the example of FIG. 6. However, the network 76 as shown in FIG. 7 is somewhat smaller, with fewer pedestals in the rows, while the network 76 in FIG. 8 is somewhat larger, with additional pedestals in the rows. Additionally, a portion of the pedestals in FIG. 8 have a similar shape as the pedestals of FIG. 7 but additionally include diamond-shaped pedestals in the last row.

Figure 9:
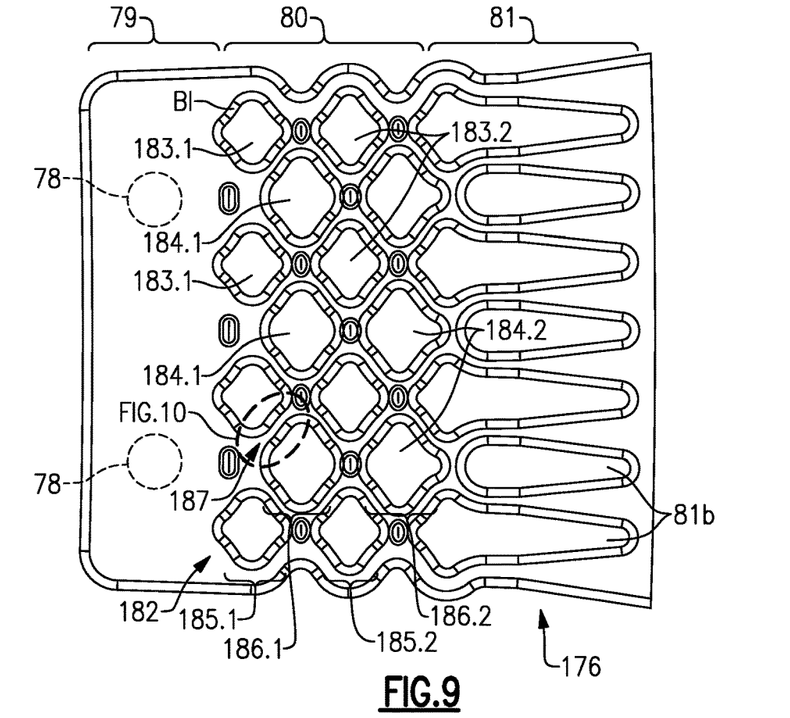
FIG. 9 illustrates another example cooling passage network that has lobed-diamond pedestals.

FIG. 9 illustrates another example of a cooling passage network 176. In this example, the network 176 contains two first rows, represented at 185.1 and 185.2, and two second rows, represented at 186.1 and 186.2. The array of pedestals 182 includes first pedestals 183.1 that are arranged in the first row 185.1, and second pedestals 184.1 that are arranged in the second row 186.1. The array of pedestals 182 further includes an additional set of first pedestals 183.2 that are arranged in the other first row 185.2, and an additional set of second pedestals 184.2 that are arranged in the other second row 186.2. The second pedestals 184.1 are radially offset from the first pedestals 183.1 and interleaved with the first pedestals 183.1 so as to define the inter-row sub-passages 187 there between. Likewise, the second pedestals 184.2 are radially offset from the first pedestals 183.2 and interleaved with the first pedestals 183.2 so as to define the sub-passages 187 there between.

In this example, the pedestals 183.1, 183.2, 184.1, and 184.2 have a lobed-diamond shape in which each of the faces of the diamond has concavities such that the tips of the diamond form rounded projections, i.e., a lobes. As a result, the geometry of the sub-passage 187 differs somewhat from that of the sub-passage 87.

Figure 10:
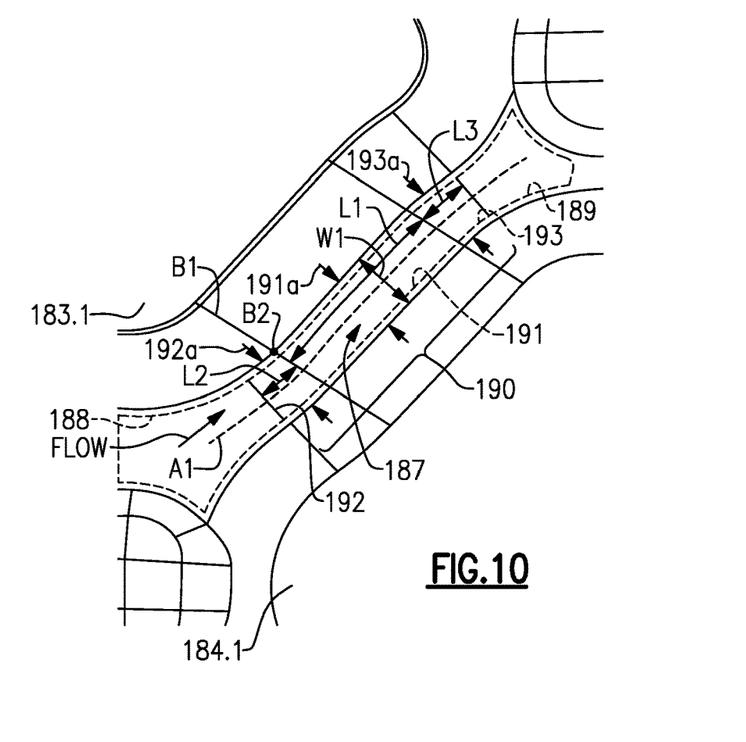
FIG. 10 illustrates a sub-passage of the cooling passage network of FIG. 9.

FIG. 10 shows a magnified view of a representative one of the sub-passages 187, in which various sections of the sub-passage 187 are identified by dashed lines. The sections are arranged along the central sub-passage axis A1, which is the midline between the sides of the adjacent first and second pedestals 183.1/184.1 (or alternatively 183.2/184.2) that define the sub-passage 187.

The sub-passage 187 has an inlet mouth 188, an outlet mouth 189, and a compound channel 190 connecting the inlet mouth 188 and the outlet mouth 189. For instance, the inlet mouth 188 converges and the outlet mouth 189 diverges with regard to the direction of flow through the sub-passage 187. Again, the limits of these sections may be demarcated by inflections or other locations on the sides of the pedestals at which the geometry of the sides distinctly changes.

The compound channel 190 includes a first channel length 191 over which the sub-passage 187 has a constant cross-section, which is represented at 191a, and a second channel length 192 over which the sub-passage 187 has a non-constant cross-section, which is represented at 192a. In a further example, the first channel length 191 is also linear.

In this example, the second channel length 192 is situated between the inlet mouth 188 and the first channel length 191. For instance, the second channel length 192 starts at the terminal end of the inlet mouth 188 and spans continuously to its own terminal end, at which the first channel length 191 then starts. The first channel length 191 is situated between the second channel length 192 and the outlet mouth 189. However, in this example, rather spanning continuously to the outlet mouth 189, there is a third channel length 193 interposed between the terminal end of the first channel length 191 and the start of the outlet mouth 189. For instance, the second and third channel lengths 192/193 are formed, at least in part, by concavities in the sides of the pedestals. Similar to the second channel length 192, the third channel length 193 has a non-constant cross-section, represented at 193a. The second and third channel lengths 192/193, which are interrupted by the first channel length 191, thus form a discontinuous passage of non-constant cross-section.

The first channel length 191 extends over a length L1, the second channel length 192 extends over a length L2, and the third channel length 193 extends over a length L3. The lengths L1, L2, and L3 are the distances along the central sub-passage axis A1. In the example shown, the length L1 of the first channel length 191 is greater than the length L2 of the second channel length L2 by at least 10%, and the length L1 is also greater than the length L3 of the third channel length 193 by at least 10%. Similar to the sub-passage 87, the length L1 of the sub-passage 187 is at least equal to the width W1 and may be greater than the width W1, such as by a factor of at least 2 or by a factor of at least 4. Moreover, the length L1 may also be no greater than 10 times the width W1 for the reasons discussed above.

Figure 11:
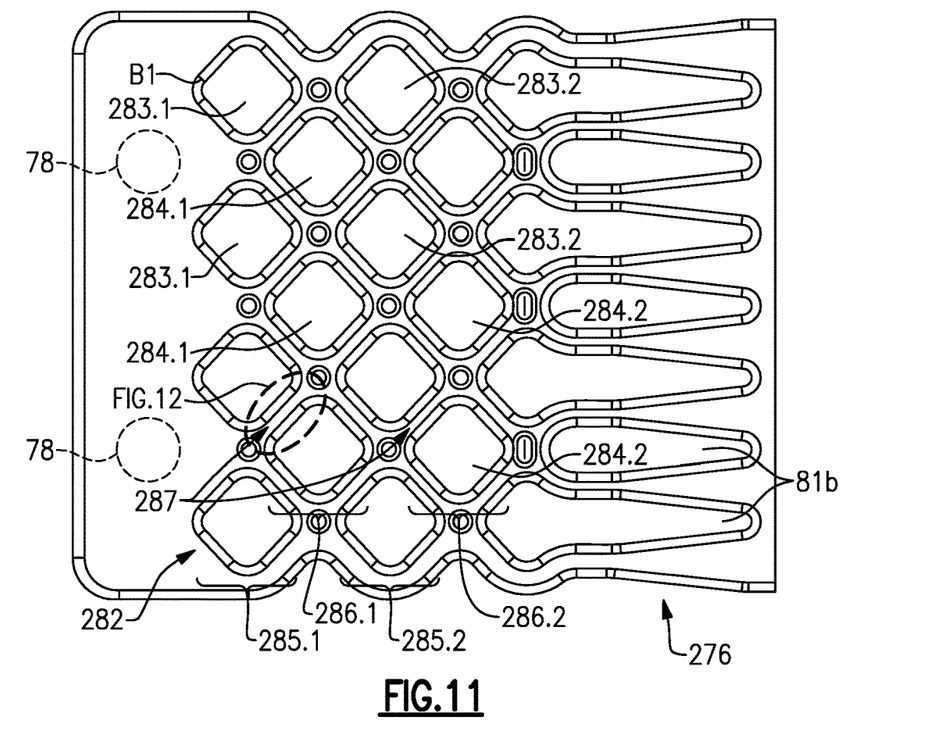
FIG. 11 illustrates another example cooling passage network that has diamond shaped pedestals.

FIG. 11 illustrates another example of a cooling passage network 276. In this example, the network 276 contains two first rows, represented at 285.1 and 285.2, and two second rows, represented at 286.1 and 286.2. The array of pedestals 282 includes first pedestals 283.1 that are arranged in the first row 285.1, and second pedestals 284.1 that are arranged in the second row 286.1. The array of pedestals 282 further includes an additional set of first pedestals 283.2 that are arranged in the other first row 285.2, and an additional set of second pedestals 284.2 that are arranged in the other second row 286.2. The second pedestals 284.1 are radially offset from the first pedestals 283.1 and interleaved with the first pedestals 283.1 so as to define the inter-row sub-passages 287 there between. Likewise, the second pedestals 284.2 are radially offset from the first pedestals 283.2 and interleaved with the first pedestals 283.2 so as to define the sub-passages 287 there between.

In this example, the pedestals 283.1, 283.2, 284.1, and 284.2 have a regular diamond shape in which each of the faces of the diamond are substantially flat. As a result, the geometry of the sub-passage 287 differs from that of the sub-passage 87/187.

Figure 12:
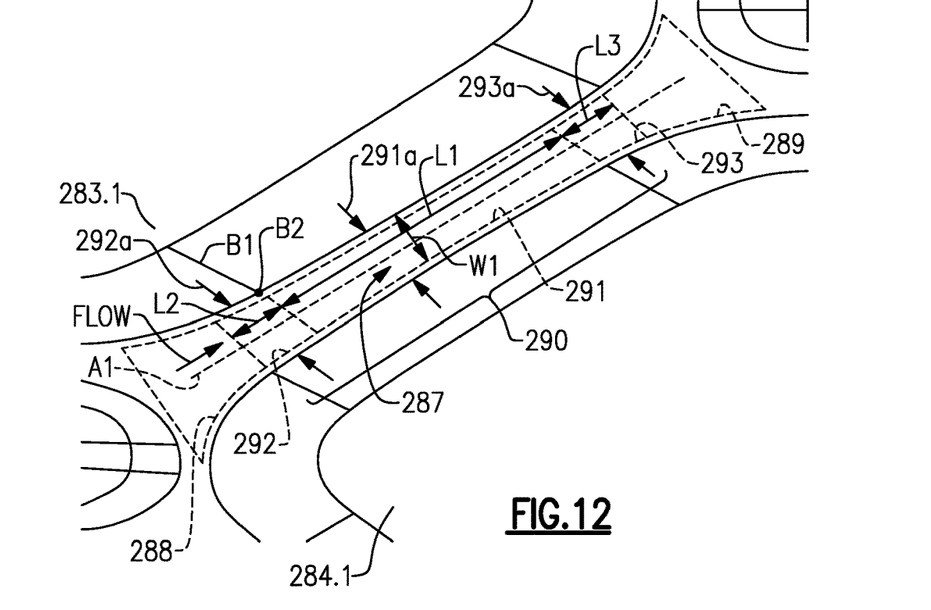
FIG. 12 illustrates a sub-passage of the cooling passage network of FIG. 11.

FIG. 12 shows a magnified view of a representative one of the sub-passages 287, in which various sections of the sub-passage 187 arranged along the central sub-passage axis A1. The sub-passage 287 has an inlet mouth 288, an outlet mouth 289, and a compound channel 290 connecting the inlet mouth 288 and the outlet mouth 289. For instance, the inlet mouth 288 converges and the outlet mouth 289 diverges with regard to the direction of flow through the sub-passage 287. Again, the limits of these sections may be demarcated by inflections or other locations on the sides of the pedestals at which the geometry of the sides distinctly changes.

The compound channel 290 includes a first channel length 291 over which the sub-passage 287 has a constant cross-section, which is represented at 291a, and a second channel length 292 over which the sub-passage 287 has a non-constant cross-section, which is represented at 292a. In a further example, the first channel length 291 is also linear.

In this example, the second channel length 292 is situated between the inlet mouth 288 and the first channel length 291. For instance, the second channel length 292 starts at the terminal end of the inlet mouth 288 and spans continuously to its own terminal end, at which the first channel length 291 then starts. The first channel length 291 is situated between the second channel length 292 and the outlet mouth 289. Rather than spanning continuously to the outlet mouth 289, the channel length 293 is interposed between the terminal end of the first channel length 291 and the start of the outlet mouth 289. While the second and third channel lengths 192/193 or the prior example are formed at least in part by concavities in the pedestal sides, the second and third channel lengths 292/293 in this example are formed by an offset between the flat side portions of the pedestals. For instance, the leading end of the flat side portion of one of the pedestals is located farther upstream in the sub-passage 287 than the leading end of the flat side portion of the opposite pedestal. Inversely, the trailing end of the flat side portion of one of the pedestals is located farther downstream in the sub-passage 287 than the trailing end of the flat side portion of the opposite pedestal. That is, the flat side portions are staggered axially but radially overlap (relative to axis A1). It is the overlap portion that defines the first channel length 291.

Similar to the second channel length 292, the third channel length 293 has a non-constant cross-section, represented at 293a. The second and third channel lengths 292/293, which are interrupted by the first channel length 291, thus form a discontinuous passage of non-constant cross-section.

The first channel length 291 extends over a length L1, the second channel length 292 extends over a length L2, and the third channel length 293 extends over a length L3. In the example shown, the length L1 of the first channel length 291 is greater than each of the lengths L2 and L3 by at least 10%. Similar to the sub-passage 87, the length L1 of the sub-passage 287 is at least equal to the width W1 and may be greater than its width W1, such as by a factor of at least 2 or by a factor of at least 4. Moreover, the length L1 may also be no greater than 10 times the width W1 for the reasons discussed herein.

Figure 13:
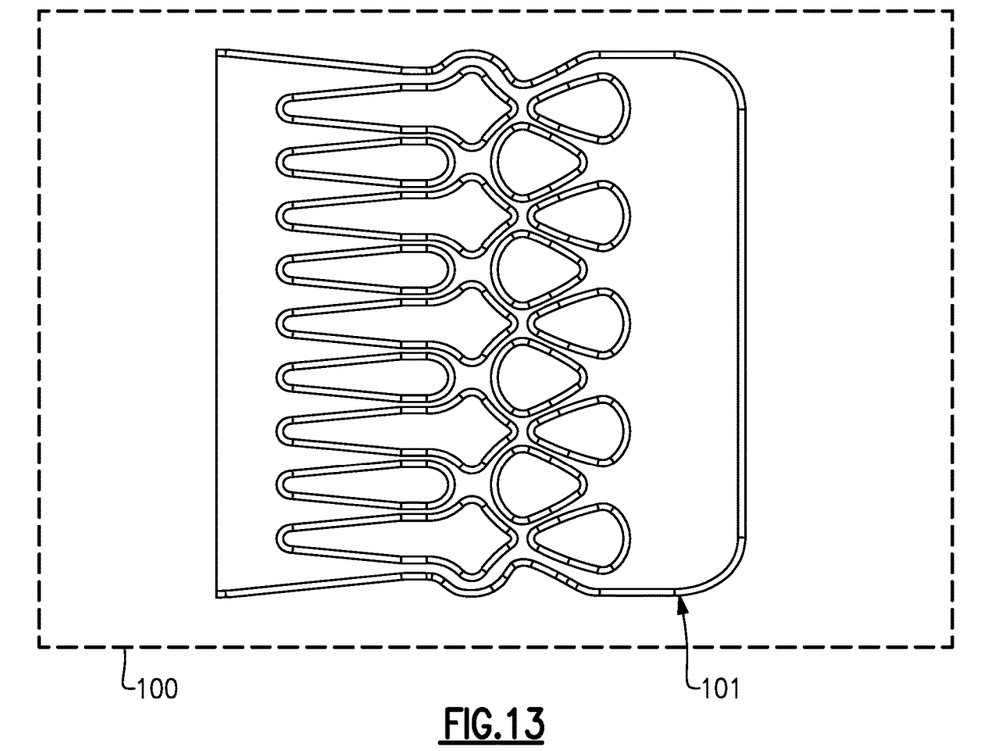
FIG. 13 illustrates a tool that has a molding cavity for molding an investment core that is shaped to form a cooling passage network as disclosed herein.

FIG. 13 schematically illustrates an investment casting tool 100 that may be used in a molding process to form any of the investment cores disclosed herein. For example, the casting tool 100 is formed of a metal alloy and may contain a hard-facing or other protective surface to reduce wear and erosion. The tool 100 includes a molding cavity 101. In this example, the molding cavity 101 is shown as an inverse view, e.g., the investment core as represented and described in FIG. 4. The molding cavity 101 thus has the attributes of the core and/or cooling passage network as described herein. It is to be understood that the tooling cavity 101 may alternatively have the shape and attributes of any of the cooling passage networks herein, all of which are incorporated by reference into the disclosure of FIG. 13 and the casting tool 100.

Figure 14:
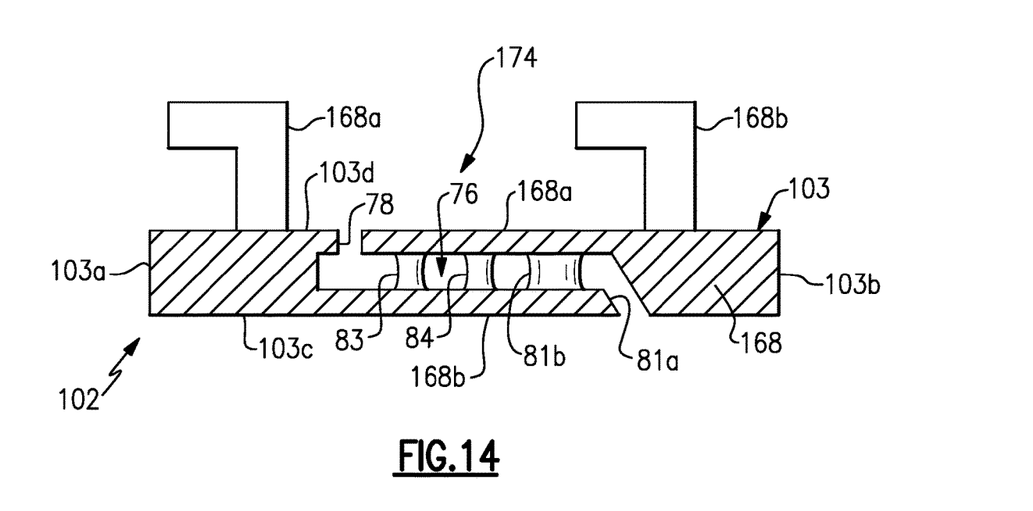
FIG. 14 illustrates an example of a blade outer air seal that includes a cooling passage network.

FIG. 14 illustrates another example gas turbine engine article 102, namely a blade outer air seal 103. The blade outer air seal 103 is an arc segment that is mounted in the engine 20 with like seals 103 to form an annular seal around the tips of the turbine blades. In this example, the cooling passage network 76 is employed in the blade outer air seal 103. It is to be understood that although the blade outer air seal 103 is shown with network 76, that the blade outer air seal 103 may alternatively employ any of the example networks 176/276 and features described or shown herein. In this example, the blade outer air seal 103 includes an article wall 168. The wall 168 defines a leading end 103a, a trailing end 103b, a gaspath side 103c, and a non-gaspath side 103d. The gaspath side 103c faces toward the core gaspath of the engine 20 and may, at times, contact tips of the turbine blades. The wall 168 defines or includes attachment members 169a/169b, which serve to secure and mount the seal 103 to a case structure in the engine 20.

The non-gaspath side 103d, and in this example also the attachment members 169a/169b, define a cavity 174. The network 76 is embedded in the wall 168 between inner and outer portions 168a/168b of the wall 168. The inlet orifice 78 of the network 76 opens through the inner portion 168a to the cavity 174. Similar to the airfoil 60, bleed air from the compressor section 24 can be provided to the cavity 174 to provide cooling air through the inlet orifice 78 into the network 76.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
an article wall defining a cavity; and
a cooling passage network embedded in the article wall between inner and outer portions of the article wall, the cooling passage network having an inlet orifice through the inner portion of the article wall to receive cooling air from the cavity, a sub-passage region including an array of pedestals, and at least one outlet orifice through the outer portion,
the array of pedestals including first pedestals arranged in a first row and second pedestals arranged in a second, adjacent row, the second pedestals being interleaved with the first pedestals so as to define inter-row sub-passages there between, each of the inter-row sub-passages thereby being bound between one of the first pedestals and one of the second pedestals, each of the inter-row sub-passages having an inlet mouth, an outlet mouth, and a compound channel connecting the inlet mouth and the outlet mouth, the compound channel including a first channel length over which the inter-row sub-passage has a constant cross-section and a second channel length over which the inter-row sub-passage has a non-constant cross-section.

2. The article as recited in claim 1, wherein the non-constant cross-section converges toward the constant cross-section.

3. The article as recited in claim 2, wherein the non-constant cross-section converges from the inlet mouth to the first channel length.

4. The article as recited in claim 3, wherein the first channel length spans a length L1 and the constant cross-section defines a width W1 that is perpendicular to the length L1, and L1 is greater than W1.

5. The article as recited in claim 4, wherein the length L1 is greater than the width W1 by a factor of at least 2.

6. The article as recited in claim 5, wherein the length L1 is no greater than 10 times the width W1.

7. The article as recited in claim 6, wherein the length L1 is greater than the width W1 by a factor of at least 4.

8. The article as recited in claim 1, wherein the first channel length spans a length L1 and the second channel length spans a length L2, and L1 is equal to L2 within +/−10%.

9. The article as recited in claim 1, wherein the first channel length spans a length L1 and the constant cross-section defines a width W1 that is perpendicular to the length L1, and L1 is greater than W1 by a factor of at least 2.

10. The article as recited in claim 9, wherein the length L1 is no greater than 10 times the width W1.

11. The article as recited in claim 10, wherein the length L1 is greater than the width W1 by a factor of at least 4.

12. The article as recited in claim 1, wherein the pedestals are either all triangular or all lobed-diamonds.

13. The article as recited in claim 1, wherein the second channel length is between the inlet mouth and the first channel length.

14. The article as recited in claim 1, wherein the first channel length spans a length L1 and the second channel length spans a length L2, and L1 is greater than L2 by at least 10%.

15. The article as recited in claim 1, further comprising a third channel length of non-constant cross-section that is discontinuous with the second channel length, wherein the second channel length is between the first channel length and the inlet mouth and the third channel length is between the first channel length and the outlet mouth.

16. The article as recited in claim 15, wherein the first channel length spans a length L1 and the constant cross-section defines a width W1 that is perpendicular to the length L1, and L1 is greater than W1 by a factor of at least 2.

17. The article as recited in claim 16, wherein the length L1 is no greater than 10 times the width W1.

18. The article as recited in claim 1, wherein each of the pedestals has an aspect ratio of no greater than 2.

19. A gas turbine engine comprising:
a compressor section;
a combustor in fluid communication with the compressor section; and
a turbine section in fluid communication with the combustor,
the turbine section having a turbine engine article that includes
an article wall defining a cavity,
a cooling passage network embedded in the article wall between inner and outer portions of the article wall, the cooling passage network having an inlet orifice through the inner portion of the article wall to receive cooling air from the cavity, a sub-passage region including an array of pedestals, and at least one outlet orifice through the outer portion, and
the array of pedestals including first pedestals arranged in a first row and second pedestals arranged in a second, adjacent row, the second pedestals being interleaved with the first pedestals so as to define inter-row sub-passages there between, each of the inter-row sub-passages thereby being bound between one of the first pedestals and one of the second pedestals, each of the inter-row sub-passages having an inlet mouth, an outlet mouth, and a compound channel connecting the inlet mouth and the outlet mouth, the compound channel including a first channel length over which the inter-row sub-passage has a constant cross-section and a second channel length over which the inter-row sub-passage has a non-constant cross-section.

20. A tool comprising:
a molding cavity operable for molding an investment core that is shaped to form a cooling passage network embedded in a wall of a gas turbine engine article, the investment core representing a negative of the cooling passage network in which solid structures of the investment core produce void structures in the cooling passage network and void structures of the investment core produce solid structures in the cooling passages network, the investment core having the negative of the following structures of the cooling passage network:
an inlet orifice, a sub-passage region including an array of pedestals, and at least one outlet orifice, and
the array of pedestals including first pedestals arranged in a first row and second pedestals arranged in a second, adjacent row, the second pedestals being interleaved with the first pedestals so as to define inter-row sub-passages there between, each of the inter-row sub-passages thereby being bound between one of the first pedestals and one of the second pedestals, each of the inter-row sub-passages having an inlet mouth, an outlet mouth, and a compound channel connecting the inlet mouth and the outlet mouth, the compound channel including a first channel length over which the inter-row sub-passage has a constant cross-section and a second channel length over which the inter-row sub-passage has a non-constant cross-section.

21. The article as recited in claim 1, wherein the first row and the second row are radial rows.

22. The article as recited in claim 21, wherein each of the pedestals has an aspect ratio of no greater than 2, each of the pedestals is three-sided, and each of the pedestals has three apexes.

23. The article as recited in claim 1, wherein the non-constant cross-section converges from the inlet mouth to the first channel length at an angle of 5° to 20°.

\* \* \* \* \*